US011119461B2

(12) United States Patent
Kanemaru (10) Patent No.: US 11,119,461 B2
(45) Date of Patent: Sep. 14, 2021

(54) CONTROLLER

(71) Applicant: Fanuc Corporation, Yamanashi (JP)

(72) Inventor: Akira Kanemaru, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 97 days.

(21) Appl. No.: 16/423,681

(22) Filed: May 28, 2019

(65) Prior Publication Data

US 2019/0369582 A1 Dec. 5, 2019

(30) Foreign Application Priority Data

Jun. 1, 2018 (JP) .............................. JP2018-106000

(51) Int. Cl.
*G05B 19/04* (2006.01)
*G05B 19/4155* (2006.01)
*G05B 19/19* (2006.01)

(52) U.S. Cl.
CPC ......... *G05B 19/0405* (2013.01); *G05B 19/19* (2013.01); *G05B 19/4155* (2013.01)

(58) Field of Classification Search
CPC G05B 19/0405; G05B 19/4155; G05B 19/19; G05B 2219/2214; G05B 19/4148; G05B 19/0421; G05B 19/414; G05B 2219/34015
USPC .......................................................... 714/15
See application file for complete search history.

(56) References Cited

U.S. PATENT DOCUMENTS

| 2004/0049710 | A1* | 3/2004 | Ashmore | G06F 11/0784 714/6.11 |
| 2006/0179487 | A1* | 8/2006 | Hatakeyama | G06F 21/79 726/26 |
| 2016/0179643 | A1* | 6/2016 | Sun | G06F 11/14 714/6.23 |
| 2018/0203622 | A1* | 7/2018 | Ishiguro | G06F 3/0619 |
| 2019/0114534 | A1* | 4/2019 | Teng | G06N 3/08 |

FOREIGN PATENT DOCUMENTS

| JP | 62-219058 A | 9/1987 |
| JP | 63254555 A | 10/1988 |
| JP | 0981526 A | 3/1997 |

OTHER PUBLICATIONS

Japanese Notice of Reasons for Refusal for Japanese Application No. 2018-106000, dated Jan. 19, 2021 with translation, 6 pages.

* cited by examiner

*Primary Examiner* — Kenneth M Lo
*Assistant Examiner* — Mohammed Shafayet
(74) *Attorney, Agent, or Firm* — RatnerPrestia (57) ABSTRACT

Provided is a controller in which resources can be safely shared by a plurality of processors, such as multi-processors or multi-core processors.
The controller is provided with the plurality of processors which each manage the resources or share the resources and include a first processor configured to perform processing with an influence on the integrity of the resources and a second processor. The second processor performs sequence processing for maintaining the integrity of the resources in accordance with the contents of the processing by the first processor, upon receiving a request message requesting the processing to be started.

1 Claim, 10 Drawing Sheets

BACKUP DURING PROCESSING

| PROCESSING | MEMBER VARIABLE | VALUE |
|---|---|---|
| UPDATED | Member_data1 | 1 |
| UPDATED | Member_data2 | 1 |
| UPDATED | Member_data3 | 1 |
| UN-UPDATED (BEING UPDATED) | Member_data4 | 0 |

BACKUP →

| 1 | 1 | 1 | 0 |
|---|---|---|---|

UPDATED / UN-UPDATED } INCONSISTENT AS DATA SET

```
Typedef struct
{
    member_data1;
    member_data2;
    member_data3;
    member_data4;
} DATA_SET;
```

PROCESSOR #1  11a

PROCESSOR #2  11b

101 REQUEST MESSAGE TRANSMISSION AND RECEPTION UNIT
- REQUEST MESSAGE TRANSMISSION
- REQUEST MESSAGE RECEPTION

102 SEQUENCE PROCESSING COMPLETION DETERMINATION UNIT
- SEQUENCE PROCESSING COMPLETION DETERMINATION

103 READY MESSAGE TRANSMISSION AND RECEPTION UNIT
- READY MESSAGE TRANSMISSION
- READY MESSAGE RECEPTION

104 END MESSAGE TRANSMISSION AND RECEPTION UNIT
- END MESSAGE TRANSMISSION
- END MESSAGE RECEPTION

- AXIS CONTROL FOR SYSTEM 2
- AXIS CONTROL FOR SYSTEM 2
- STANDBY (PROCESSING STOP)
- AXIS CONTROL FOR SYSTEM 2

OCCURRENCE OF DATA SET INCONSISTENCY DUE TO IMMEDIATE SHIFT TO STANDBY STATE AFTER REQUEST MESSAGE RECEPTION

CONTINUATION OF EXECUTION PROCESSING WITHOUT SHIFT TO STANDBY STATE UNTIL COMPLETION OF SEQUENCE PROCESSING

SHIFT TO STANDBY STATE AFTER CONFIRMATION OF COMPLETION OF SEQUENCE PROCESSING

CONTROLLER

RELATED APPLICATIONS

The present application claims priority to Japanese Patent Application Number 2018-106000 filed Jun. 1, 2018, the disclosure of which is hereby incorporated by reference herein in its entirety.

BACKGROUND OF THE INVENTION

Field of the Invention

The present invention relates to a controller, and more particularly, to a controller in which resources can be shared by a plurality of processors, such as multi-processors or multi-core processors.

Description of the Related Art

A controller for controlling an industrial machine (hereinafter simply referred to as the "machine"), such as a robot or a machine tool, generally has a function of backing up various data. For example, if the controller detects that the power supply is switched to a UPS (uninterruptible power system) due to a power failure or the like, it backs up necessary on-memory data for its restart to a predetermined storage device (hereinafter simply referred to as the "storage"). Thereafter, the controller stops the power supply from the UPS. Specifically, the controller performs shutdown processing. Moreover, the controller performs the above backup regularly as well as upon the occurrence of an event such as a power failure. Thus, the controller improves the availability of a system in which the controller is included.

If the backed-up data are inconsistent or faulty, such an event may occur that the machine fails to be started up at the time of resumption or to operate normally. In such a case, a machining failure or crash will occur, possibly resulting in a great damage. Moreover, if consistent or normal data are backed up, these data can be ported to another system that is equipped with a machine and a controller similar to those in which the data are backed up. In this way, the porting destination system can be started up relatively easily.

Figure 1:
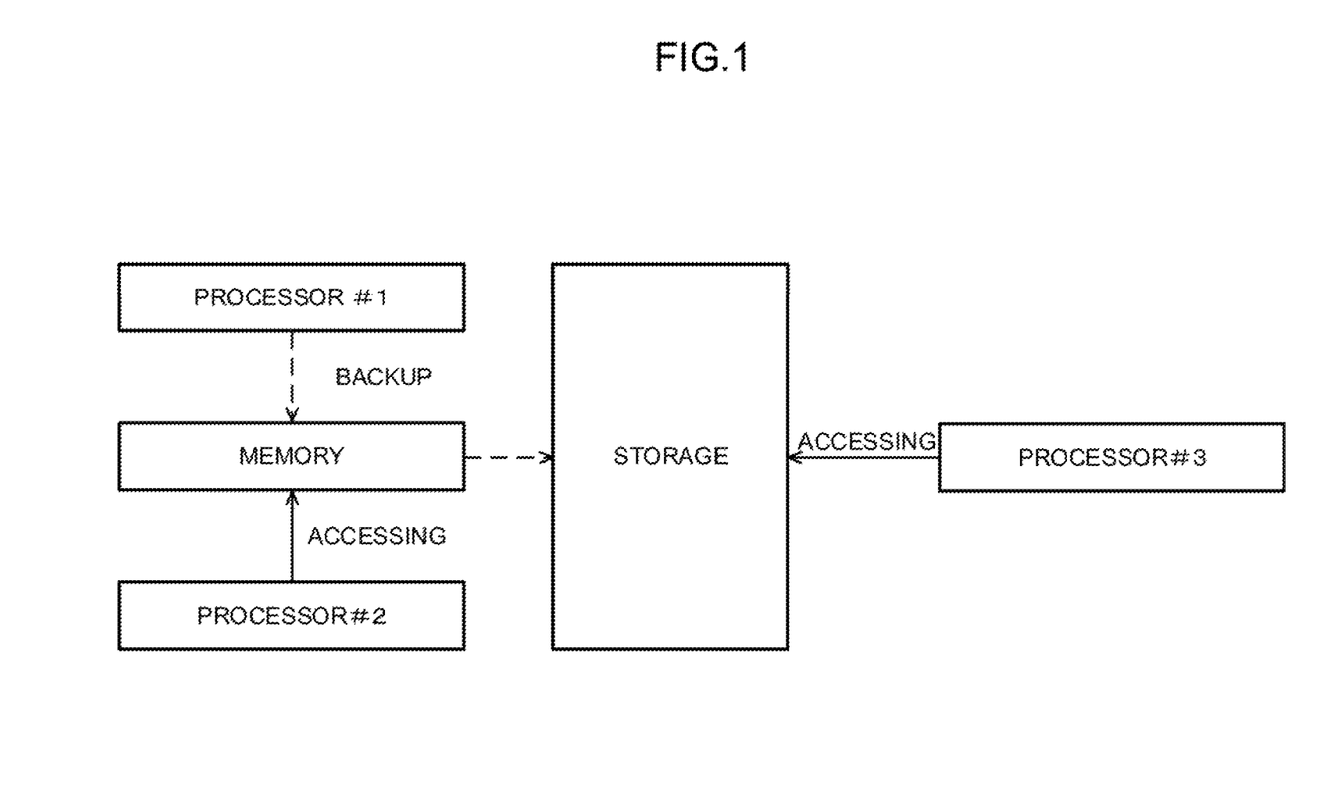
FIG. 1 is a diagram showing an example of occurrence of data inconsistency.

In a controller comprising a multi-processor or multi-core processor, an access to the on-memory data to be backed up or to the backup destination storage may sometimes occur simultaneously from a plurality of processors or cores. As shown in FIG. 1, for example, a processor #1 may sometimes make an attempt to back up the on-memory data to the storage when a processor #2 is accessing the on-memory data or a processor #3 is accessing the storage. In such a case, the backup sometimes cannot be guaranteed with data integrity. In other words, the processor #1 cannot normally back up the data in some cases, or otherwise, the backup may take a very long time.

In order to avoid such a situation, the controller is generally provided with a mechanism (exclusive control mechanism or the like using a semaphore as disclosed in Japanese Patent Application Laid-Open No. 62-219058) for managing accesses from a plurality of processors or cores to resources such as memories and storages. In a system in which access processing is subjected to complicated dependency due to inclusion of a large number of processors and cores, however, the access management is very complicated. The dependency mentioned here implies such a relationship that an access of a certain processor (or core) to a specific resource and processing performed by another processor (or core) compete with or influence each other. It requires a very large number of man-hours and burdens a developer to analyze such dependency of access processing or implement a program for exclusive control on each of programs for performing the access processing. Moreover, a reduction in performance due to overhead caused by the implementation of the program for exclusive control and an increase in code quantity are also problematic.

An operating system for a general-purpose computer provides a function of backing up on-memory data, such as a snapshot or hibernation, to a predetermined storage. However, this function only serves to back up the on-memory data at an arbitrary moment and does not guarantee the integrity of the on-memory data.

Figure 2:
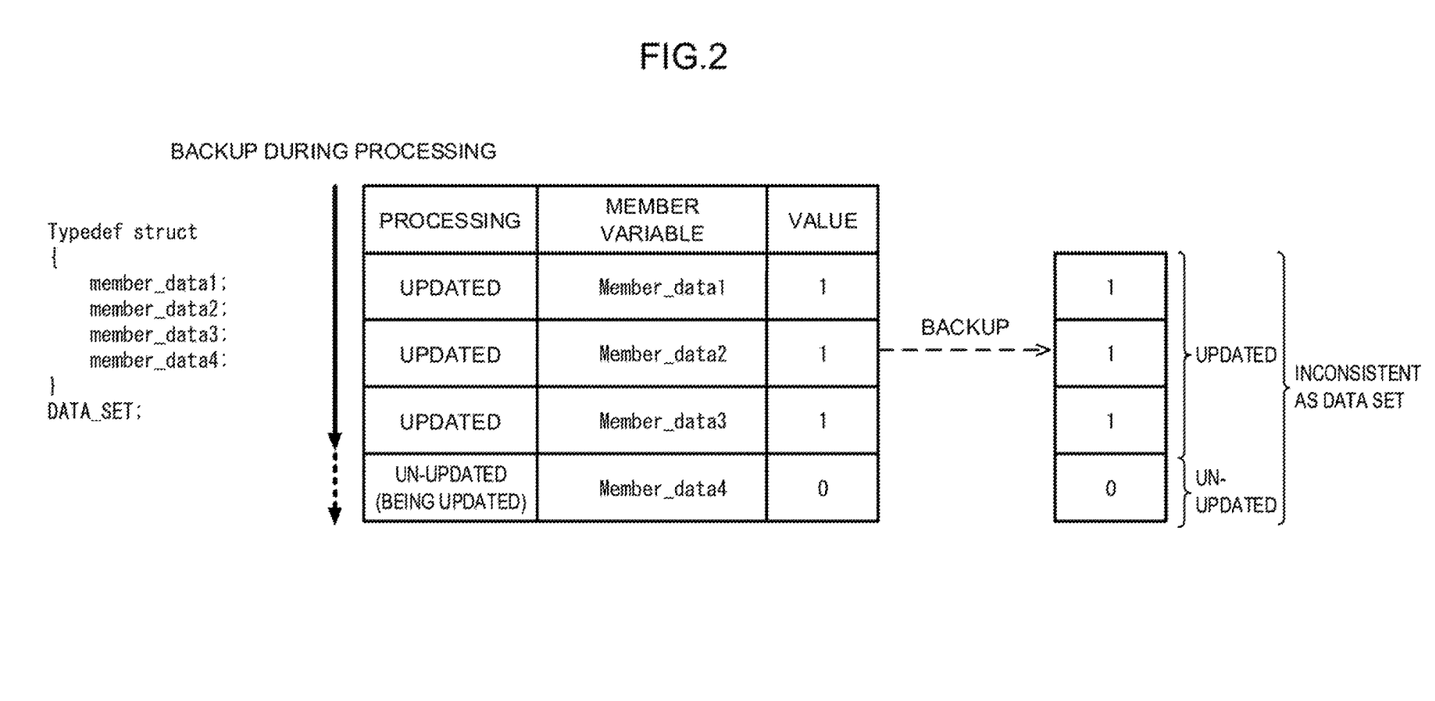
FIG. 2 is a diagram showing an example of occurrence of data inconsistency.

Let it be assumed that, as shown in FIG. 2, for example, a structure with four member variables is defined as one data set. Moreover, let us suppose that all these four member variables will be updated if the controller performs a certain command. In this case, if the snapshot function is performed with three of the member variables updated and the fourth one un-updated, the backed-up data set will not be able to maintain data integrity. Thus, if the data integrity is guaranteed, then the result of execution of the command is completely reflected to all the data (four member variables in the foregoing example) related to the execution of the command.

The snapshot and hibernation functions are effective for the investigation of malfunction and quick restart from a system failure. However, these functions are unfit for the backup that requires a strict guarantee of the data integrity. In a controller for an industrial machine with high real-time performance and high update frequency for a data set, in particular, it is difficult to employ the snapshot and hibernation functions.

It is also conceivable to guarantee the data integrity by performing waiting between the processors or cores until the data set is completely updated. In general, however, a command for waiting must be implemented in the program performed by each processor and each core, in order to perform the waiting between the processors or between the cores until the data set is completely updated. Moreover, if the waiting is performed between the processors or between the cores every time the data set is updated, the performance may possibly be considerably reduced.

Figure 3:
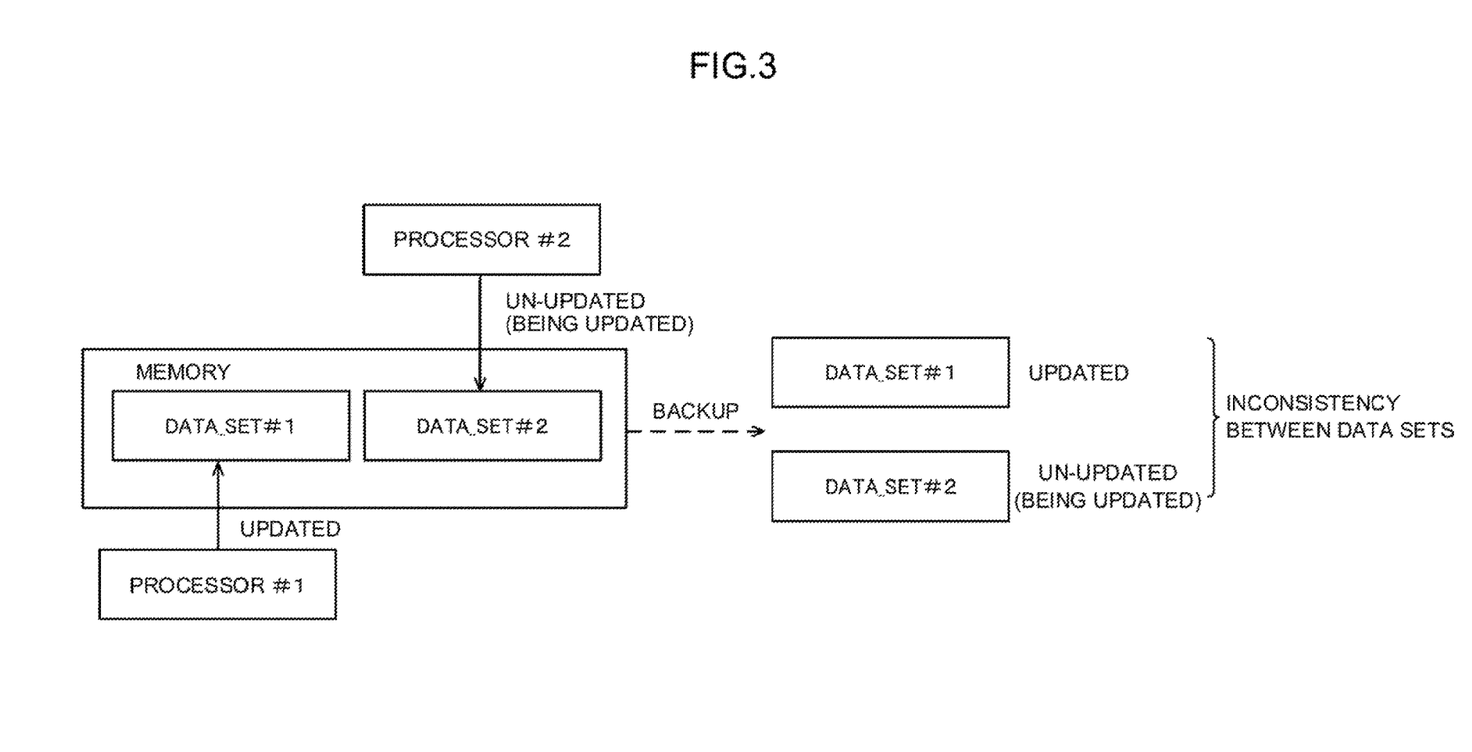
FIG. 3 is a diagram showing an example of occurrence of data inconsistency.

Moreover, data inconsistency may sometimes occur if the backup is performed in an arbitrary timing when a plurality of processors or cores cooperate with one another to perform data update processing. Let it be assumed that, as shown in FIG. 3, for example, data sets DATA_SET #1 and DATA_SET #2 are designed to be updated in association with execution of a certain sequence. In this case, if the backup is performed with the update of the data set DATA_SET #1 completed by the processor #1 and the update of the data set DATA_SET #2 not completed by the processor #2, inconsistency occurs between the data sets DATA_SET #1 and DATA_SET #2.

Thus, in the prior art in which the data backup is performed in an arbitrary timing, it is difficult to guarantee the data integrity. This is a problem that may also similarly occur when data stored in a storage or portable device are input or output or a shutdown sequence is performed, as well as when memory contents are backed up. Moreover, storages or devices in backup destinations and input/output destinations also require access management. In that case, the backup and data input/output can be said to be very difficult processing in an information processing system in which a multi-processor or multi-core processor operates, especially in a controller for an industrial machine with high real-time performance.

In a conventional controller for an industrial machine, based on this background, the data backup and input/output are performed at the stage when the controller operates with a single processor or single core immediately after the controller is powered on, in many cases. This is because the industrial machine is particularly strongly required of the data integrity and a very large number of data, such as parameters, are expected to be backed up. However, if the controller is powered on again for the data backup and data input/output only, peripheral devices (e.g., actuators, measuring instruments, and motor amplifiers) are heavily burdened. Moreover, the re-powering of the controller is a wasteful work that has a considerable influence on manufacturing processes.

The present invention has been made to solve these problems and has an object to provide a controller in which resources can be safely shared by a plurality of processors, such as multi-processors or multi-core processors.

SUMMARY OF THE INVENTION

A controller according to one embodiment of the present invention is a controller comprising a plurality of processors which each manage resources or share resources. The controller comprises a first processor configured to perform processing with an influence on the integrity of the resources and a second processor. The second processor performs sequence processing for maintaining the integrity of the resources in accordance with the contents of the processing by the first processor, upon receiving a request message requesting the processing to be started.

The first processor of the controller according to the one embodiment of the present invention performs backup processing for on-memory data as the aforesaid processing.

The first processor of the controller according to the one embodiment of the present invention performs shutdown processing as the aforesaid processing.

The controller according to the one embodiment of the present invention comprises a request message transmission and reception unit configured to notify the second processor of the request message requesting the processing to be started, a ready message transmission and reception unit configured to notify the first processor of a ready message indicative of completion of sequence processing influenced by the processing, and an end message transmission and reception unit configured to notify the second processor of an end message indicative of completion of the processing. The first processor is set to a standby state after the notification of the request message and resumes operation after the notification of the ready message, and the second processor is set to a standby state after the notification of the ready message and resumes operation after the notification of the end message.

According to the present invention, there can be provided a controller in which resources can be safely shared by a plurality of processors, such as multi-processors or multi-core processors.

BRIEF DESCRIPTION OF THE DRAWINGS

The above and other objects and features of the present invention will be obvious from the following description of embodiments with reference to the accompanying drawings, in which.

DETAILED DESCRIPTION OF THE PREFERRED EMBODIMENTS

Embodiment 1

Figure 9:
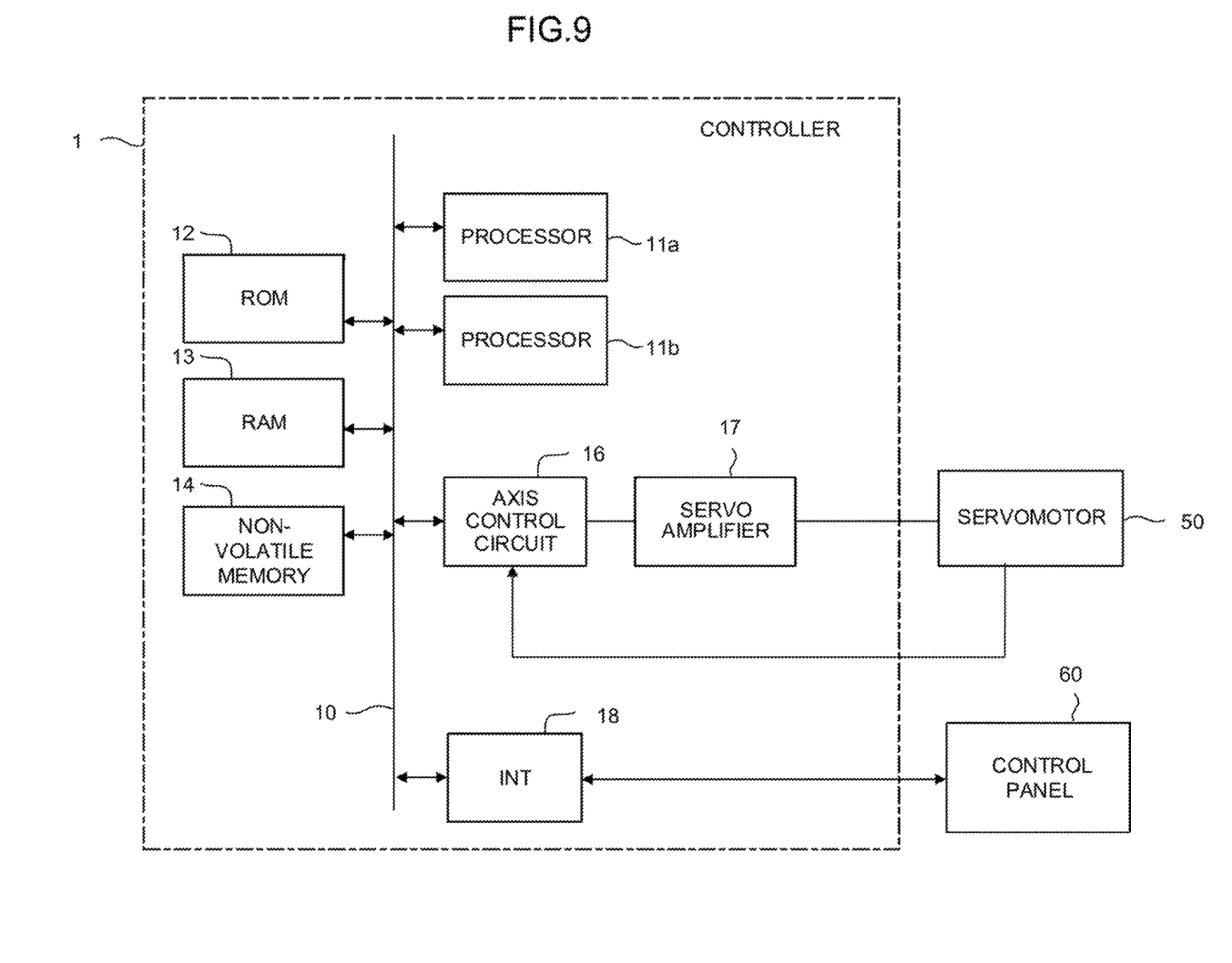
FIG. 9 is a diagram showing a hardware configuration of the controller.

FIG. 9 is a schematic hardware configuration diagram showing a controller 1 according to Embodiment 1 of the present invention. The controller 1 is a numerical controller that, for example, reads a program and controls a machine such as a machine tool, robot, or the like. The controller 1 comprises a plurality of processors 11 (two of the processors (11a and 11b) are illustrated in FIG. 9 as an example), ROM (read-only memory) 12, RAM (random access memory) 13, non-volatile memory 14, interface 18, bus 10, axis control circuit 16, and servo amplifier 17. The interface 18 is connected with, for example, a control panel 60.

The processors 11 are processors for generally controlling the controller 1. The processors 11 read out system programs stored in the ROM 12 via the bus 10 and control the entire controller 1 according to the system programs.

In the present embodiment, the controller 1 comprises the plurality of processors 11 (11a and 11b). Each of the processors 11 (11a and 11b) is equivalent to each core of each processor or multi-core processor in a multi-processor environment, for example.

The ROM 12 previously stores system programs for executing various controls of the machine.

The RAM 13 temporarily stores temporary calculation data and display data, data and the like input by an operator through the control panel 60. The RAM 13 is, for example, a DRAM (dynamic random access memory).

The non-volatile memory 14 is backed up by, for example, a battery (not shown). Therefore, the non-volatile memory 14 maintains its storage state even when the controller 1 is shut down. The non-volatile memory 14 is, for example, a battery-backed SRAM (static random access memory). The non-volatile memory 14 is used as, for example, a backup storage for data on the RAM 13.

The axis control circuit 16 controls the motion axes of the machine. The axis control circuit 16 receives movement command amounts for the axes output by the processors 11 and outputs movement commands for the axes to the servo amplifier 17.

Upon receiving the axis movement commands output by the axis control circuit 16, the servo amplifier 17 drives a servomotor 50.

The servomotor 50 is driven by the servo amplifier 17 to move the motion axes of the machine. The servomotor 50 typically has a position/speed detector built-in. The position/speed detector outputs a position/speed feedback signal. Position/speed feedback control is performed as this position/speed feedback signal is fed back to the axis control circuit 16.

In FIG. 1, the axis control circuit 16, servo amplifier 17, and servomotor 50 are each shown as being only one in number. Actually, however, these elements are provided corresponding in number to the axes of the machine to be controlled. In the case where a robot with six axes is controlled, for example, six sets, in total, of the axis control circuit 16, servo amplifier 17, and servomotor 50 may sometimes be provided corresponding individually to the axes.

The control panel 60 is a data input/output device equipped with a display, hardware keys, and the like. The control panel 60 displays information received from the processors 11 through the interface 18 on the display. The control panel 60 delivers commands, data, and the like input from the hardware keys and the like to the processors 11 through the interface 18.

Figure 4:
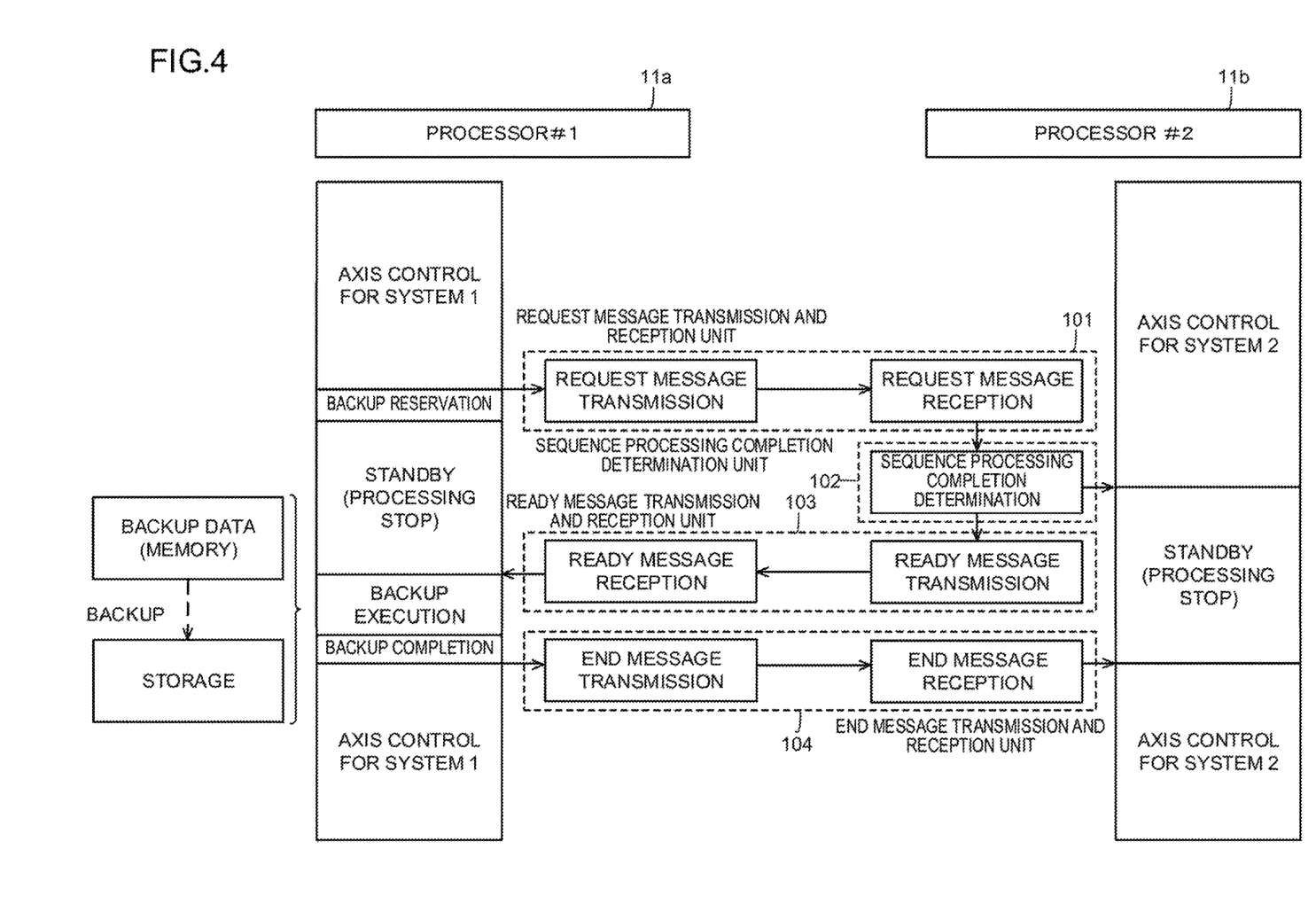
FIG. 4 is a diagram showing the function and operation of a controller.

FIG. 4 is a block diagram showing the schematic function and operation of the controller 1 according to the present embodiment. The controller 1 comprises a request message transmission and reception unit 101, sequence processing completion determination unit 102, ready message transmission and reception unit 103, and end message transmission and reception unit 104. The request message transmission and reception unit 101, sequence processing completion determination unit 102, ready message transmission and reception unit 103, and end message transmission and reception unit 104 may be implemented as one function of the processors 11 in hardware-wise. Moreover, the request message transmission and reception unit 101, sequence processing completion determination unit 102, ready message transmission and reception unit 103, and end message transmission and reception unit 104 may be implemented as the processors 11 execute programs stored the ROM 12, RAM 13, or non-volatile memory 14, for example.

Figure 10:
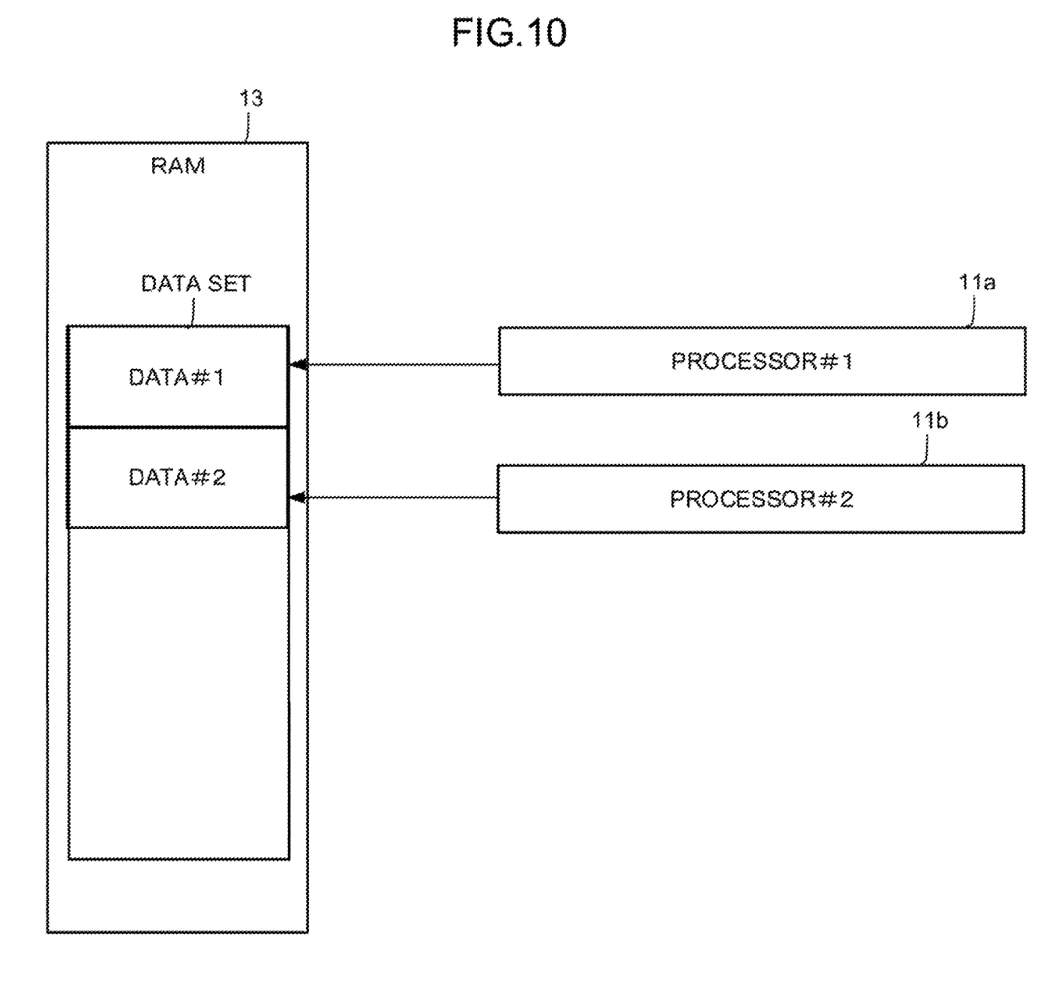
FIG. 10 is a diagram showing the relationship between processors.

The processor 11*a* (processor #1) and the processor 11*b* (processor #2) of FIG. 4 manage their respective resources on the RAM 13. In the present embodiment, as shown in FIG. 10, the processors 11*a* and 11*b* independently manage different data (data #1 and #2) in one data set.

The request message transmission and reception unit 101 transmits a request message from the processor 11*a* (arbitrary processor or core; processor #1 in FIG. 4) to the processor 11*b* (each of all the other processors or cores; processor #2 in FIG. 4). The processors 11*a* and 11*b* are in a one-to-many relationship.

The request message is a message to the effect that backup processing is to be performed, which is notified to message recipients (processors 11*b*) by a sender (processor 11*a*). The request message includes information (index of a memory block) for specifying data (including the data sets) to be backed up.

After the request message is transmitted, the request message transmission and reception unit 101 brings the processor 11*a* to an execution waiting state (standby state) for the backup processing.

Upon receiving the request message, the processors 11*b* notify the sequence processing completion determination unit 102 of the contents of the request message.

The sequence processing completion determination unit 102 determines whether or not sequence processing performed by the request message recipients (processors 11*b*) is completed. The sequence processing is processing related to the contents of the request message. Specifically, the processors 11*b* specify the data for access to the index of the memory block included in the request message and terminate the sequence processing related to the data.

If the sequence processing is determined to have been completed, the sequence processing completion determination unit 102 sets the processors 11*b* to their standby state and transmits a notification to the ready message transmission and reception unit 103.

The ready message transmission and reception unit 103 transmits ready messages from the request message recipients (processors 11*b*) to the request message sender (processor 11*a*).

The ready messages are messages to the effect that part of processing related to the request message recipients (processors 11*b*), out of the sequence processing related to the backup processing performed by the request message sender (processor 11*a*), is completed, which are notified to the request message sender (processor 11*a*).

The processor 11*a* determines whether or not the ready messages are received from all the processors 11*b* as destinations of the request messages. If the processor 11*a* concludes that the ready messages are received from all the processors 11*b* as the destinations of the request messages, the ready message transmission and reception unit 103 releases the execution waiting state (standby state) for the backup processing of the processor 11*a*.

The processor 11*a* performs the backup processing.

The end message transmission and reception unit 104 transmits an end message from the request message sender (processor 11*a*) to the request message recipients (processors 11*b*).

The end message is a notification message to the effect that the backup processing is completed in the request message sender (processor 11*a*).

The end message transmission and reception unit 104 releases the standby state of the processors 11*b* having received the end message.

Figure 5:
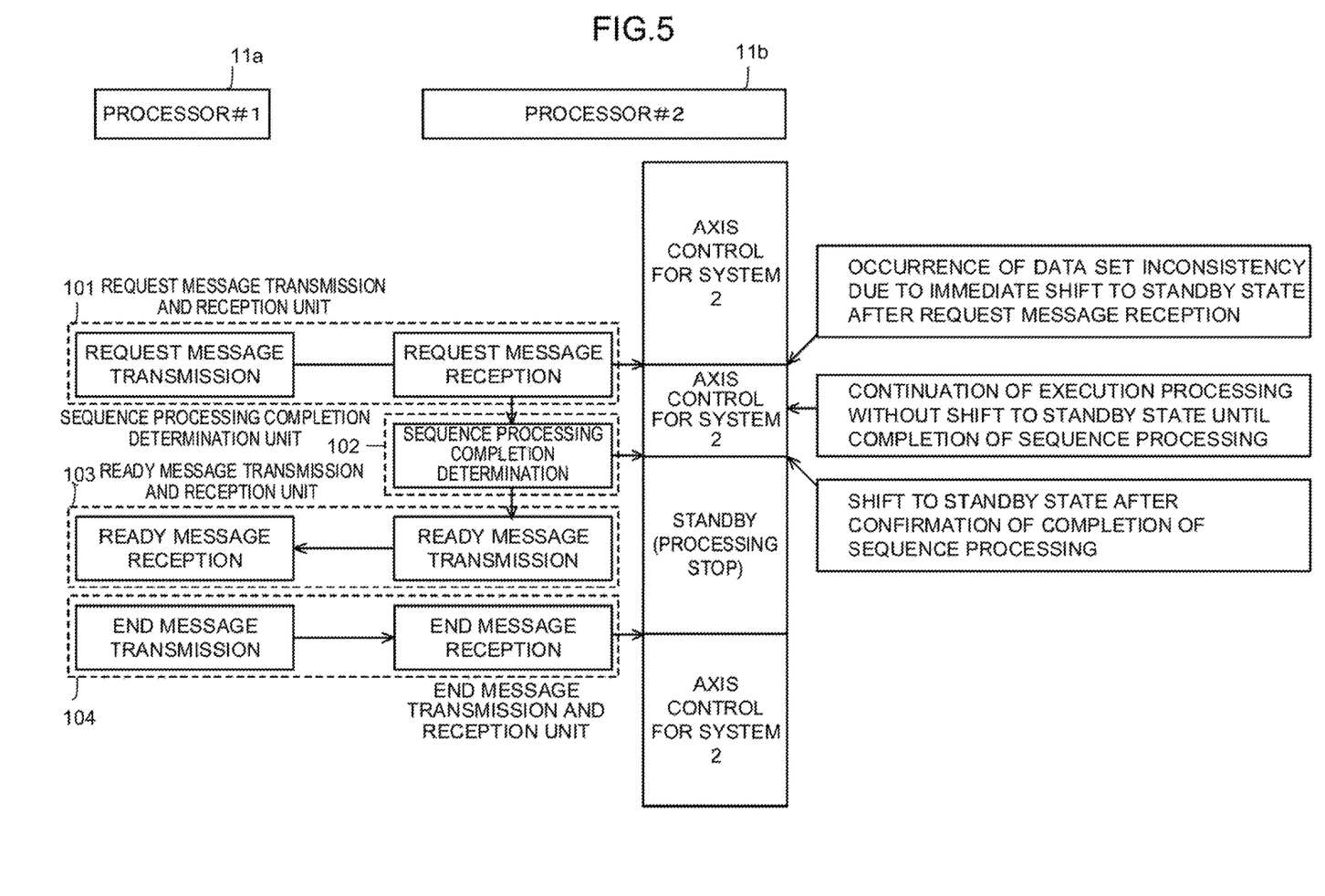
FIG. 5 is a diagram showing the function and operation of the controller.

Advantages of the present embodiment over the prior art will be described with reference to FIG. 5. The sequence processing completion determination unit 102 as a constituent element of the present embodiment confirms that the sequence processing related to the data to be backed up in all the processors 11*b* having received the request messages is completed. Thereafter, the sequence processing completion determination unit 102 shifts the processors 11*b* to the standby state. If the processors 11*b* are shifted to the standby state immediately after receiving the request messages, inconsistency is inevitably caused between the data sets. In the present embodiment, however, the sequence processing completion determination unit 102 does not allow the processors 11*b* to shift to the standby state until the sequence processing ends and continues the sequence processing so that the data sets become consistent. Thus, inconsistency is not caused between the data sets.

Figure 6:
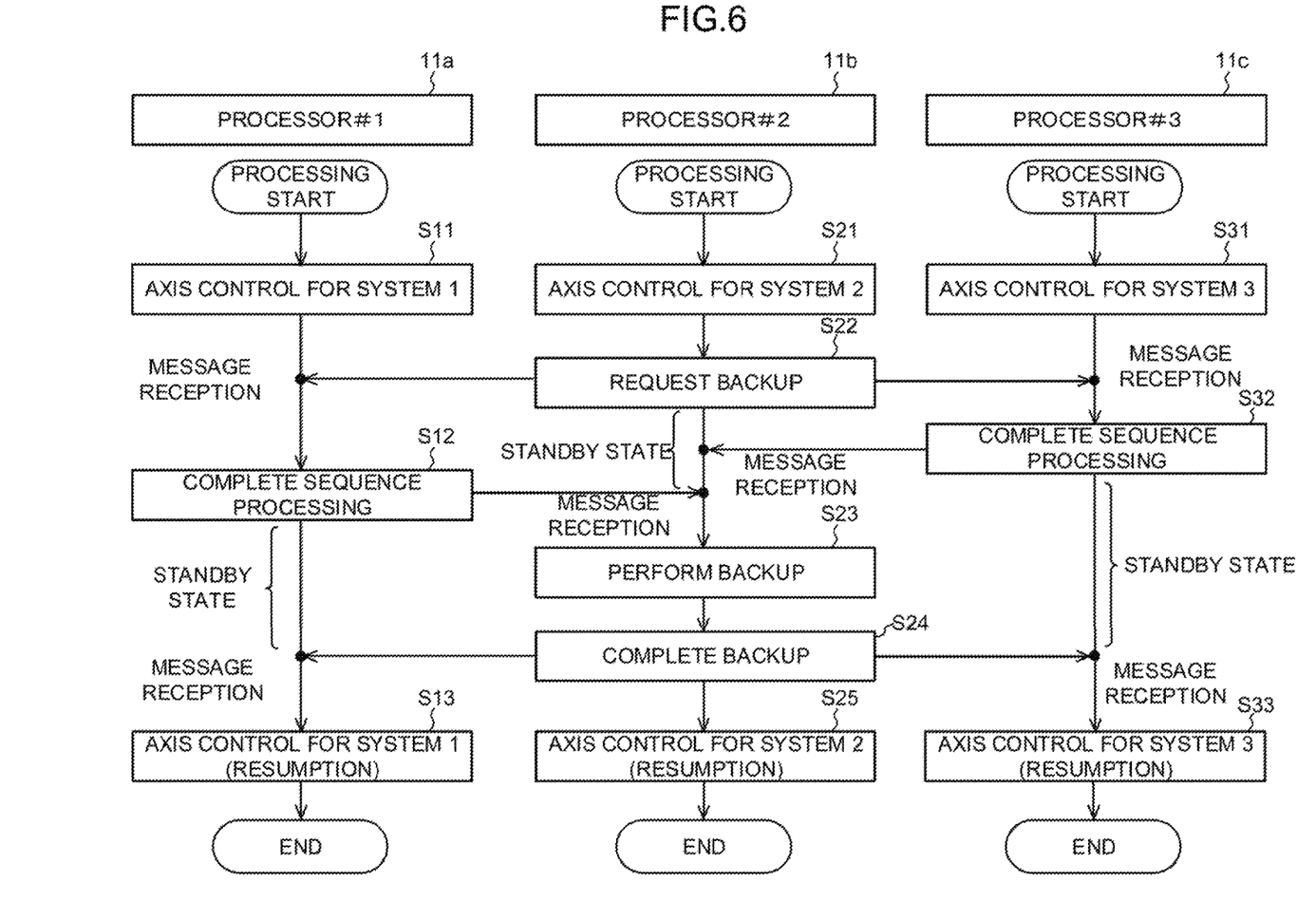
FIG. 6 is a diagram showing the operation of the controller.

FIG. 6 is a chart showing an example of a processing flow between the processors in the case where the processors 11*b* (processors #2) execute data backup in the controller 1 in which a processor 11*a* (processor #1), processor 11*b* (processor #2), and processor 11*c* (processor #3) perform axis control of a system 1, axis control of a system 2, and axis control of a system 3, respectively.

In an initial state, the processors 11a, 11b and 11c perform steps of processing related to the axis controls of the first, second, and third systems 1, 2 and 3, respectively (S11, S21 and S31).

The processor 11b transmits request messages for backup processing to the processors 11a and 11c (S22). Thereafter, the processor 11b is set to the standby state.

Upon receiving the request messages, the processors 11a and 11c complete sequence processing related to the contents of the request messages (S12 and S32). Thereafter, the processors 11a and 11c transmit ready messages to the processor 11b. Thereupon, the processors 11a and 11c are set to the standby state.

If it is confirmed that the ready messages are received from all the processors 11a and 11c, the processor 11b releases the standby state and performs the backup processing (S23). When the backup processing is completed, the processor 11b transmits an end message to the processors 11a and 11c (S24). Moreover, the processor 11b resumes the execution of the axis control of the system 2 (S25).

Upon receiving the end message, the processors 11a and 11c release the standby state and resume the execution of the axis controls of the systems 1 and 3 (S13 and S33).

According to the present embodiment, even the controller 1 that frequently updates data and performs complicated access processing can perform data backup guaranteed with data integrity, data input/output, a shutdown sequence, and the like. Moreover, the present embodiment can avoid problems such as a reduction in performance due to overhead caused if a program for exclusive control is implemented, oppression of the storage or memory due to an increase in code quantity, and the like.

Moreover, the present embodiment is configured so that the sequence processing is completed before the backup in a necessary range for the maintenance of the data integrity, in accordance with the contents of the request messages. In other words, the present embodiment is configured so that the backup processing is on standby until the completion of the sequence processing. Thus, the execution range of the sequence processing, that is, the guarantee range of the data integrity, is appropriately set according to the dependency between the systems or between control axes.

In the embodiment described above, a series of processing steps is illustrated as being performed with the request messages for the backup processing as triggers. However, the types, forms, and contents of the request messages, the contents and range of the sequence processing, and the like may be different, depending on the type of processing performed by a primary processor or core. In the case where the backup processing is performed, for example, terms and conditions may be allowed to be appropriately changed depending on differences in aspects, such as backup for the non-volatile memory 14 and the ROM 12, backup to an external storage, and the like.

Embodiment 2

Figure 7:
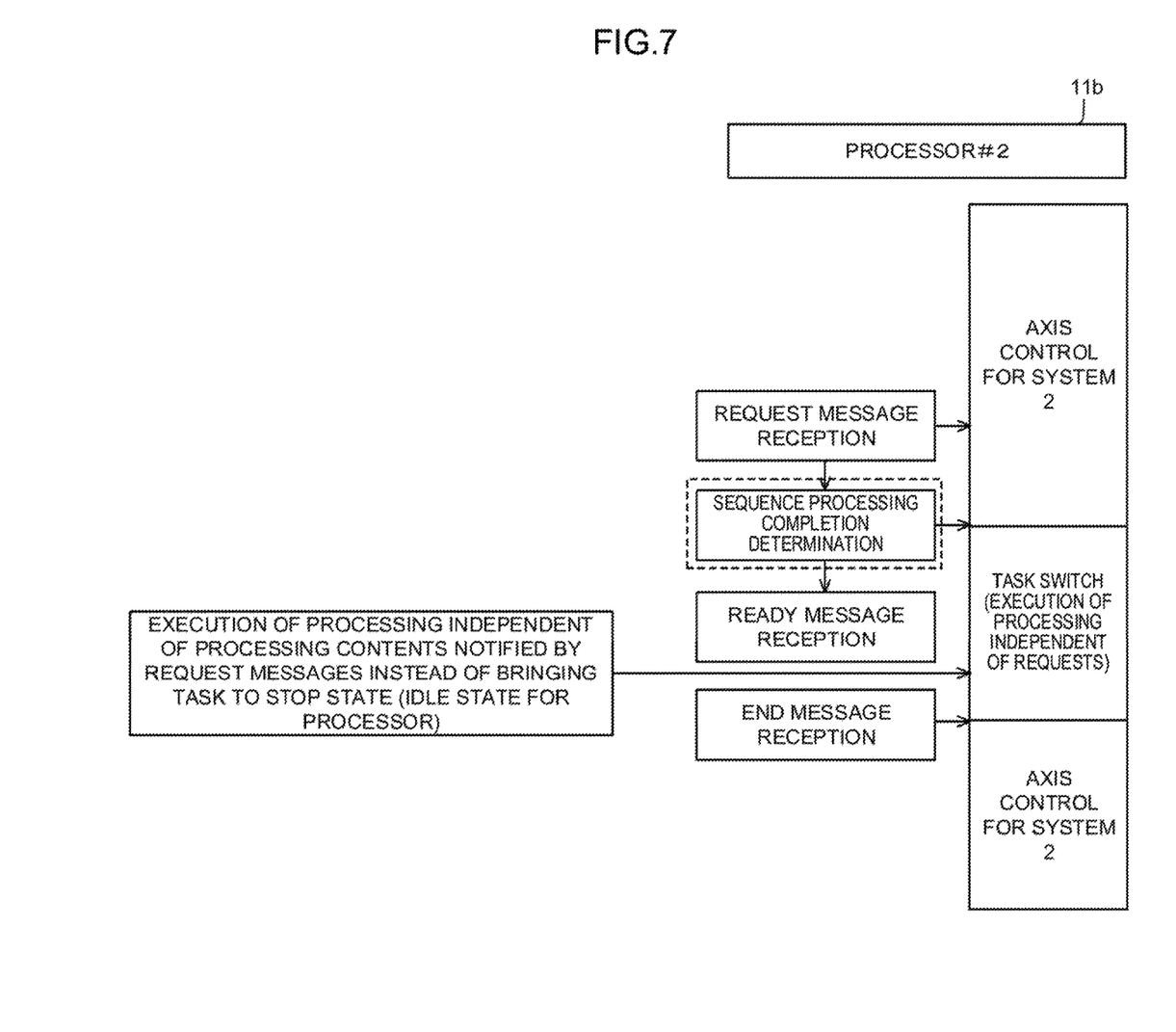
FIG. 7 is a diagram showing the function and operation of the controller.

The operation of a controller 1 according to Embodiment 2 will be described with reference to FIG. 7. Embodiment 2 is a modification of Embodiment 1. The constituent elements and operation of the controller 1 according to Embodiment 2 are the same as those of Embodiment 1 unless otherwise specified.

In the present embodiment, a request message recipient (processor 11b in the case of Embodiment 1) is implemented with, as an alternative task, processing that does not depend on (or does not influence) processing (backup processing in the case of Embodiment 1) notified by a request message. After transmitting a ready message, the processor 11b performs the alternative task instead of shifting to the standby state. Specifically, the processor 11b continues to perform a task irrelevant to the backup processing in a memory space independent of the backup processing.

Upon receiving an end message, in this case, the end message transmission and reception unit 104 determines whether the processor 11b is in a completion waiting state (standby state) for the backup processing or in a state in which the alternative task is being performed. If the processor 11b is in the completion waiting state (standby state) for the backup processing, the standby state is released. If the alternative task is being performed, in contrast, the task (e.g., axis control) having been being performed at the time of the request message reception is performed.

According to the present embodiment, the processor or core having received the request message can perform the alternative task while it is waiting for the completion of requested processing, so that the processing efficiency of the entire controller 1 can be improved.

Embodiment 3

The operation of a controller 1 according to Embodiment 3 will be described with reference to FIG. 8. Embodiment 3 is a modification of Embodiment 1. The constituent elements and operation of the controller 1 according to Embodiment 3 are the same as those of Embodiment 1 unless otherwise specified.

In the present embodiment, completion determination conditions for sequence processing and operation after end message reception are changed depending on the types of messages transmitted from a primary processor.

Figure 8:
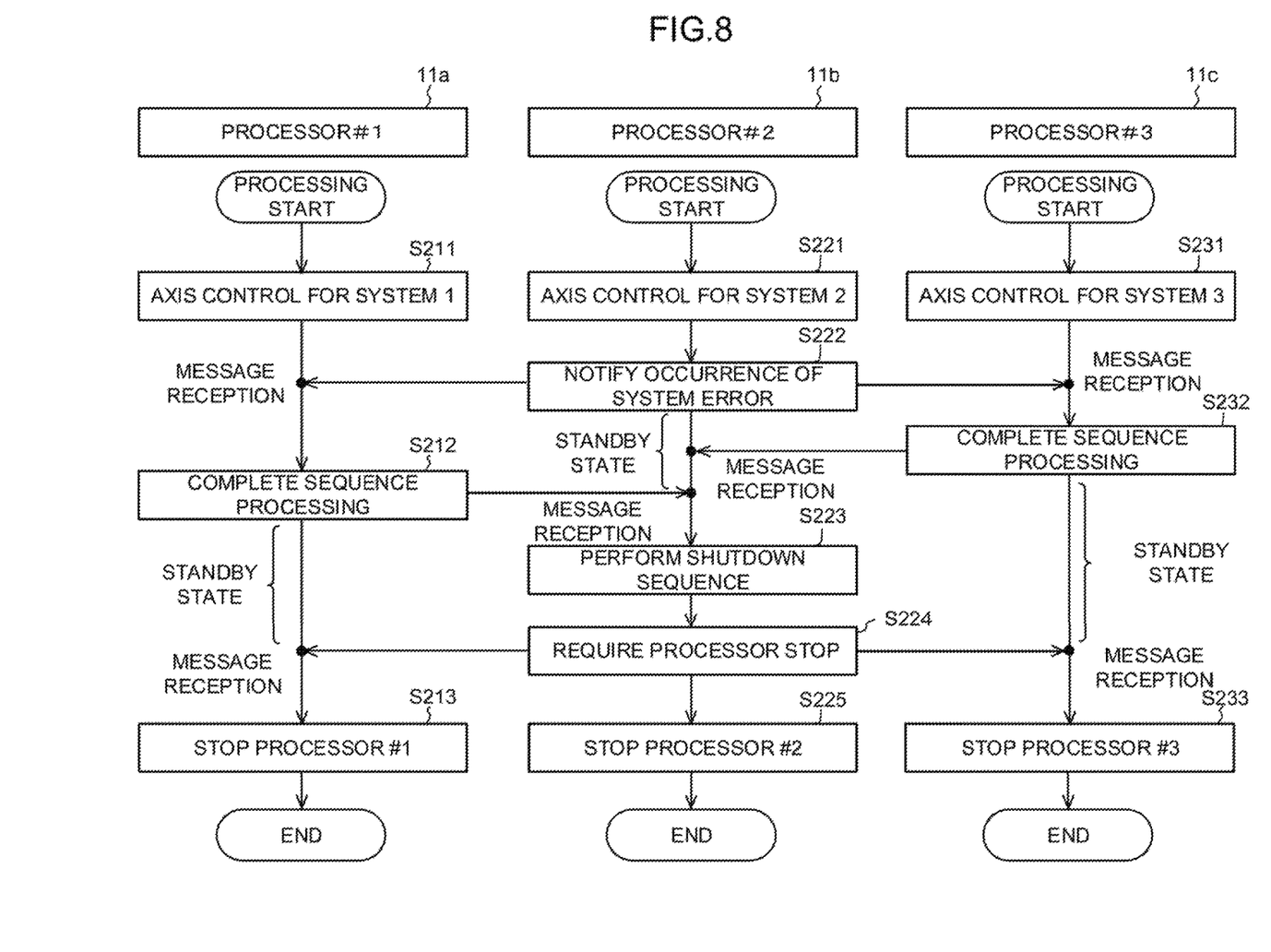
FIG. 8 is a diagram showing the operation of the controller.

FIG. 8 is a chart showing the operations of a processor 11a (processor #1), processor 11b (processor #2), and processor 11c (processor #3) in the case where an operation scheme related to backup processing of Embodiment 3 is applied to a shutdown sequence upon the occurrence of a system error.

In an initial state, the processors 11a, 11b and 11c perform steps of processing related to the axis controls of first, second, and third systems 1, 2 and 3, respectively (S211, 5221 and S231).

The processor 11b transmits system error occurrence notifications (equivalent to the request messages for the backup processing of Embodiment 1) to the processors 11a and 11c (S222). The system error occurrence notifications are also assumed to include information related to an index of a memory block in which data to be backed up exists. Thereafter, the processor 11b is set to the standby state.

Upon receiving the system error occurrence notifications, the processors 11a and 11c individually complete sequence processing related to the data to be backed up. The processors 11a and 11c may be configured to perform, at the time of reception of the system error occurrence notifications, processing for resetting a register, reducing the core frequency, or the like, to be ready for the execution of the shutdown sequence (S212 and S232). When the sequence processing and the like are completed, the processors 11a and 11c transmit ready messages to the processor 11b. Thereafter, the processors 11a and 11c are set to the standby state.

If it is confirmed that the ready messages are received from all the processors 11a and 11c, the processor 11b releases the standby state and performs the shutdown sequence (S223). When the shutdown sequence is completed, the processor 11b transmits a processor stop request (equivalent to the end message of Embodiment 1) to the processors 11a and 11c (S224). Moreover, the processor 11b stops its operation (S225).

Upon receiving the processor stop request, the processors 11a and 11c release the standby state and stop their operations (S213 and S233).

While embodiments of the present invention have been described herein, the invention is not limited to the above embodiments and may be suitably modified and embodied in various forms.

For example, the present invention is not limited to the data backup, data input/output, and shutdown sequence and is applicable to various uses. For example, the present invention is applicable to a method of communication between processors or cores upon the occurrence of a system error, an execution method for emergency stop processing for safely stopping a system, and the like. Moreover, the present invention can also be used as a method for initializing a specific memory on a memory map in resuming an application.

The invention claimed is:

1. A controller comprising a plurality of processors which each manage resources or share resources, the controller comprising:
a first processor configured to control a machine; and
a second processor configured to control the machine,
wherein the controller is configured to:
control, by the first processor and the second processor, the machine,
transmit, by the second processor, a request message for backup processing to the first processor, the message identifying data sets to be backed up, and enter by the second processor, a second standby state after the transmission of the request message,
when the request message is received, complete processing, by the first processor, the identified data sets for controlling the machine,
when the processing of the identified data sets is complete, transmit, by the first processor, a ready message to the second processor, and enter by the first processor, a first standby state after the transmission of the ready message,
when the ready message is received, perform, by the second processor the backup processing of the identified data sets,
when the backup processing is complete, transmit, by the second processor, an end message to the first processor, and
when the end message is received, resume, by the first processor, controlling the machine.

* * * * *